United States Patent [19]

Furfari et al.

[11] Patent Number: 4,665,469
[45] Date of Patent: May 12, 1987

[54] HEADLIGHT ADJUSTER GEAR ASSEMBLY

[75] Inventors: Frank Furfari, Brunswick; Leroy P. Harr, Parma; Joseph J. Dillon, Canal Fulton, all of Ohio

[73] Assignee: Eaton Corporation, Cleveland, Ohio

[21] Appl. No.: 837,247

[22] Filed: Mar. 7, 1986

[51] Int. Cl.⁴ ............................................. B60Q 1/06
[52] U.S. Cl. .................................. 362/66; 74/606 R; 74/89.13; 74/25
[58] Field of Search .............. 362/66, 69, 63, 65, 362/70; 74/417, 25, 606 R, 89.13, 89.15

[56] References Cited

U.S. PATENT DOCUMENTS

| | | | |
|---|---|---|---|
| 488,426 | 12/1892 | Chambers et al. | 74/89.13 |
| 618,053 | 1/1899 | Brown | 74/89.13 |
| 723,447 | 3/1903 | Eaton | 74/89.13 |
| 1,739,318 | 12/1929 | Leach | 74/25 |
| 4,269,287 | 5/1981 | Rösch | 74/606 R |
| 4,435,994 | 3/1984 | Hata et al. | 74/606 R |
| 4,441,378 | 4/1984 | Ponczek | 74/606 R |
| 4,516,191 | 5/1985 | Moriyama et al. | 362/66 |
| 4,521,993 | 6/1985 | Tacheny et al. | 74/606 R |
| 4,524,407 | 6/1985 | Igura | 362/66 |
| 4,524,638 | 6/1985 | Van Hee | 74/606 R |

Primary Examiner—Raymond A. Nelli
Attorney, Agent, or Firm—D. A. Rowe; A. E. Chrow

[57] ABSTRACT

A headlight adjuster gear assembly (100) is provided having a pair of angularly oriented intermeshed gear members comprising a driven gear member (4) adapted to be rotated and cause rotation of a driving gear member (4) which is operable upon rotation to adjust a vehicular headlight. Gear members (2, 4) are enclosed by a pair of housing members (80, 90) that are hinged together at one end and fastened at an opposite end by pins (28) or other suitable means to prevent loss of either or both housing members (80, 90) upon their detachment as well as provide improved resistance to their separation from torque arising during the adjusting process.

12 Claims, 4 Drawing Figures

HEADLIGHT ADJUSTER GEAR ASSEMBLY

INTRODUCTION

This invention relates generally to a gear assembly enclosed by a protective housing that is operative to enable rotation of an adjusting screw from an angular position for adjusting a vehicular headlight and more particularly to such assembly where the protective housing comprises two opposed housing members that are joined together by a hinge member that enables them to pivot away from each other to provide a convenient means of access to the gear members contained therewithin.

BACKGROUND OF THE INVENTION

Adjusting screws have been used for many years to adjust position of vehicular headlights so that they focus ahead of the vehicle in an effective manner. Characteristically, the headlights are mounted on a moveable frame enabling the headlight to be positioned up and down and sideways in either direction by rotating adjusting screws having threaded nuts of some kind secured to a fixed frame of the vehicle with a portion of the screws threaded through the nuts and in contact with the moveable frame enabling rotative adjustment of the headlight position.

Until recently, vehicles were designed such that access to such adjusting screws was straight forward without angularity complexities. More recently, greater complexity and more limited space availability has resulted in increased difficulty in providing direct line access to the adjusting screws resulting in the requirement for angular gear drive assemblies particularly 90° gear drive assemblies for enabling one to rotate the adjusting screws to position the headlight in the manner desired.

It is known to provide some type of protective housing about such angular gear assemblies to protect the gears from damage and contamination as well as provide rotational support for the gears. It is further known to make such housings as two-part members that are completely detachable from each other to provide access to the gears for examination, replacement and repair.

Although such prior-art type protective housings have been used to advantage, they have the disadvantage that, once removed, the two parts can become separated from each other resulting in lost time and expense in locating them or having to replace at least one of the parts.

SUMMARY OF THE INVENTION

Accordingly, it is an object of this invention to provide a gear drive assembly for adjusting a vehicular headlight that includes a protective housing for protecting the gear members from contamination and damage as well as providing rotational support for the gear members.

It is another object of this invention to provide a gear drive assembly for adjusting a vehicular headlight that includes a two-piece protective housing for enclosing the gear members that are joined together by a hinge member as well as by releasable engagement means enabling the two pieces to separate sufficiently for access to the gear members without having to separate them completely from each other.

DESCRIPTION OF THE SOME PREFERRED EMBODIMENTS

Figure 1:
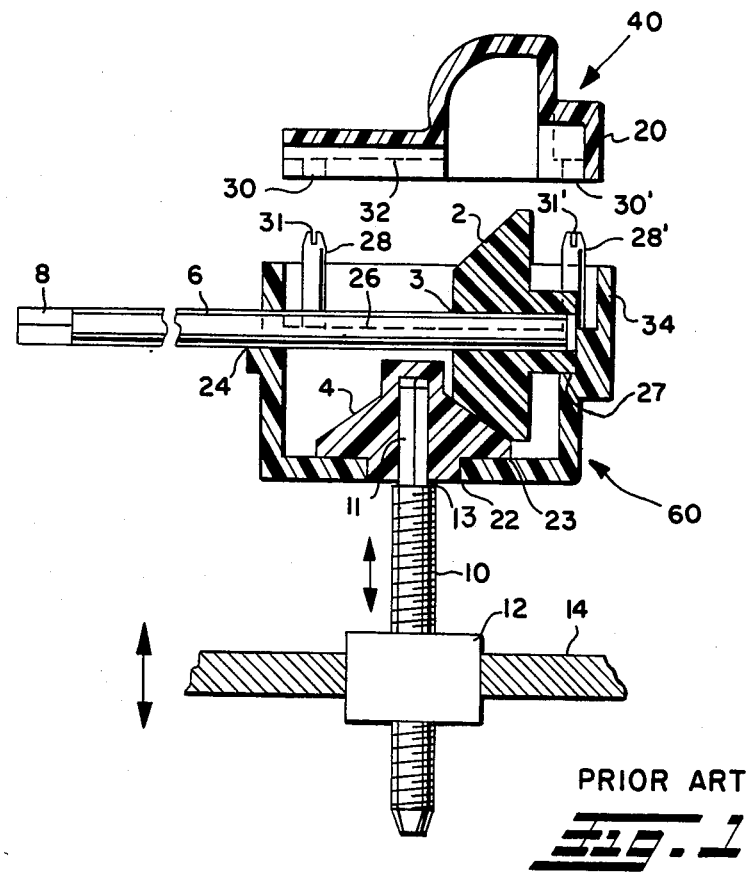
FIG. 1 shows a cross-sectional side elevation view of a prior-art gear assembly for adjusting a vehicular headlight.

The prior art gear assembly shown in FIG. 1 has a first gear member 2 that is in intermeshed engagement with second gear member 4 with their respective rotational axis displaced 90° from each other.

Although the prior art gear drive assembly for rotating a headlight adjusting screw features a 90° displacement between the rotational axis of the two gears, for purposes of this invention, other angular relationships between the rotational axis of gear member 2 and 4 are included within the scope of the invention.

Gear member 2 is secured to drive member 6 at its rotational axis and is operative to enable one to rotate gear member 2 in opposite rotational directions. Although drive member 6 may have any suitable configuration for purposes of this invention, the prior-art drive member 6 is an elongate member such as a rod which has one end secured to surrounding walls of an opening 3 in gear member 2 disposed coaxially to its rotational axis. The opposite end of drive member 6 may be shaped to enhance rotation of gear member 2 such as by having a groove in the end adapted for insertion of a screw driver or by having flats such as flats 8 for advantageous use with a wrench.

An adjustment screw 10 is secured to gear member 4 at its rotational axis such that the two rotate simultaneously in the same rotational direction. An end of adjustment screw 10 is secured to surrounding walls of an opening 13 in gear member 4 such as shown in FIG. 1.

Both opening 13 and the end of adjustment screw 10 within opening 13 are shaped to enhance their simultaneous rotation such as by having respective hexagonal cross-sectional shapes such as referenced as 11 in FIG. 1 and known in the prior art.

Adjustment screw 10 is threadingly engaged with a suitable nut member 12 which is secured to a moveable frame 14 operable to position the vehicle headlight.

Generally, gear members 2 and 4 are operative such that rotation of drive member 6 causes gear member 2 to rotate which in turn causes gear member 4 to rotate which in turn causes screw 10 to rotate and advance nut member 12 and frame 14 in a direction according to the direction of rotation of members 6, 2, 4 and 10 which in turn causes moveable frame 14 to correspondly move and position the vehicular headlight in the manner desired since there is usually a plurality of such adjustment screws operative to enable the positioning.

Thus by means of the angular relationship between the rotational axis of gear members 2 and 4 such as the prior art 90° relationship shown in FIG. 1, one is able to rotate adjusting screw 10 from a location that is displaced angularly from its rotational axis.

Gear members 2 and 4 are enclosed by a prior-art housing member that comprises housing members 40 and 60 which although shown separated in FIG. 1 are adapted to releasably join together to protect gear members 2 and 4 from contamination and damage. Housing members 40 and 60 are generally secured against movement relative frame 14 and are also provided jointly or severally with access openings such as opening 24 enabling drive member 6 to enter an opening 22 providing an opening for screw 10 to enter. Housing members 40 and 60 are also adapted to jointly and severally provide rotational support for gear members 2 and 4 such as curved surface 27 supporting a hub of gear member 2; opening 22 and surface 23 providing rotational support for gear member 4 and, where required, the curved surface of opening 24 providing rotational support for drive member 6.

Housing member 40 and 60 have heretofore been joined together by a plurality of spaced-apart pins 28 and 28' which extend from a surface 26 of housing member 60 and are respectively adapted to enter correspondly spaced-apart, aligned openings 30 and 30' in surface 32 of housing member 40 which faces and is substantially parallel to surface 26 of housing member 60. The spaced-apart relationship between openings 30 and 30' into which pins extend from housing member 60 to join them together is shown in the top view of housing members 40 and 60 shown in FIG. 2 which also shows that the prior art includes openings such as spaced-apart openings 36 and 36' for securing housing members 40 and 60 jointly to a fixed frame of the vehicle and which, for purposes of this invention, includes any suitable means of securing them jointly or severally to a fixed frame of the vehicle.

Prior-art housing 60 includes a surrounding lip 34 which is adapted to encircle edge 20 of housing member 40 when member 40 is joined to member 60 to enhance the protection provided gear members 2 and 4.

Pins 28 and 28' of prior-art housing member 60 are provided with slits 31 and 31¹ at their respective ends and are dimensionally adapted so they can penetrate through corresponding openings 30 and 30' in member 40 and enable the two housing members to snap into releasable resilient locked engagement with each other subject, of course, to the problem of becoming completely separated upon their disengagement as previously described. It has further been found that the prior-art two-part pinned together housing members hereinbefore described are prone to separate from each other when the gear members are subjected to higher torque conditions such as more than about 1.7 newton-meters of torque and thus become completely separated whereas, in contrast, the two-part housing of the assembly of the invention has been found to resist separation under high torque conditions as well as enable the two parts to remain hinged together even though the pin connectors therebetween may become separated under such torque conditions.

Although the prior-art housing and gear members are preferably made from a molded plastic material, either or both of the housing members as well as either or both of the gear members as well as either or both the drive member and the adjusting screw may be made of any material suitable for the particular application involved.

Figure 2:
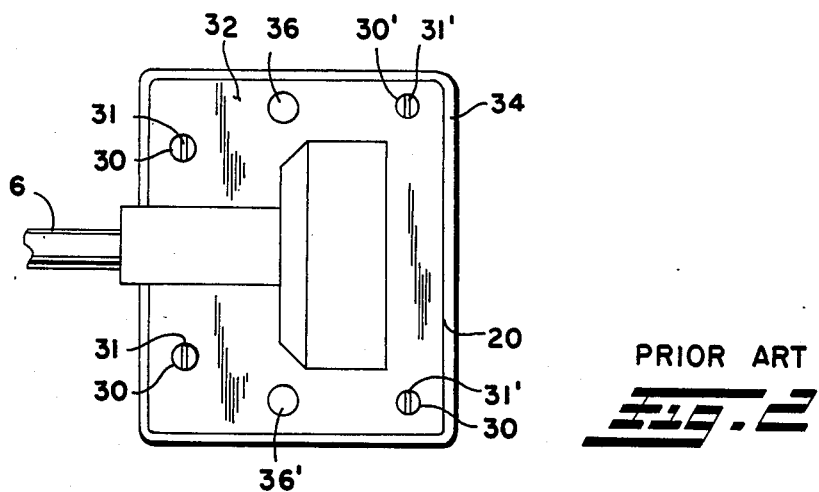
FIG. 2 shows a plan elevation view of a top of a housing member used in the prior-art gear assembly of claim 1.
Figure 3:
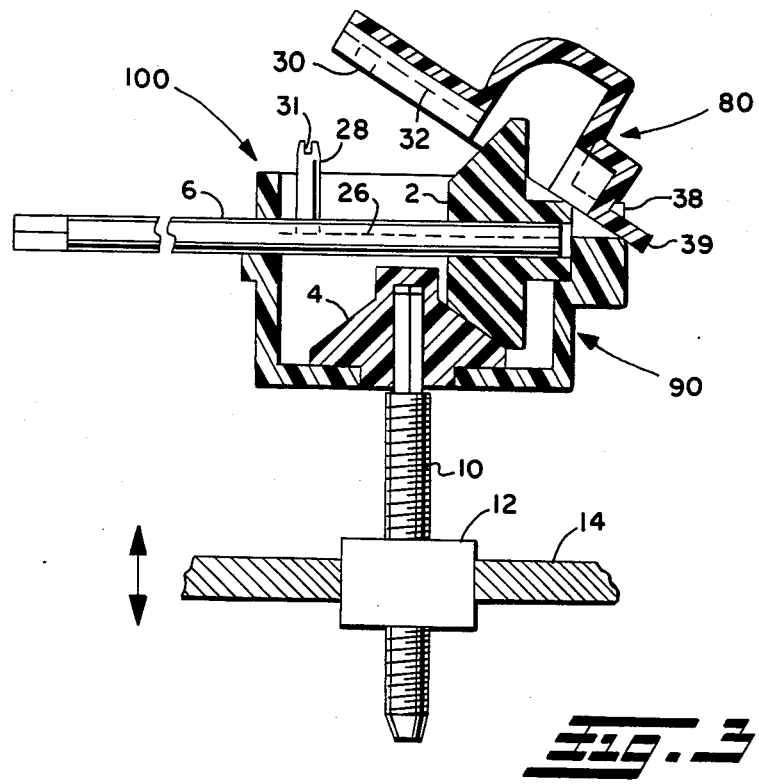
FIG. 3 shows a cross-sectional side elevation view of an embodiment of the gear assembly of the invention.
Figure 4:
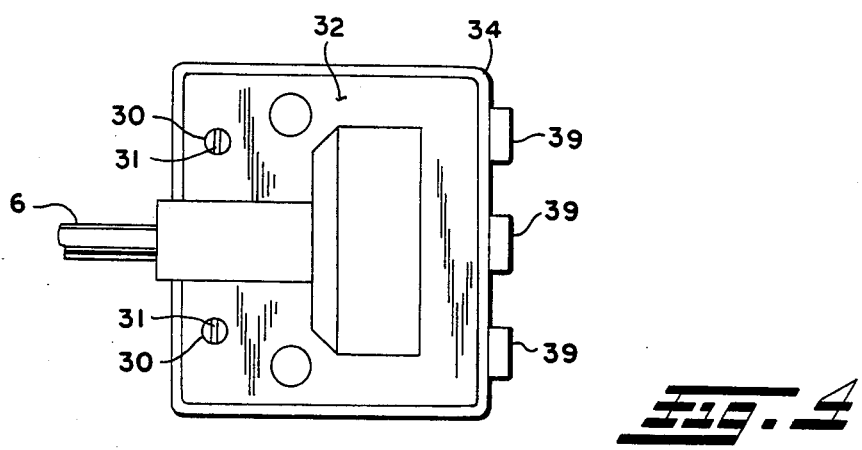
FIG. 4 shows a plan elevation view of a top of a housing member used in the assembly of FIG. 3.

An embodiment of the invention in the form of gear assembly 100 is shown in FIGS. 3 and 4. The functional relationship between drive member 6, gears 2 and 4, adjustment screw 10, nut member 12, moveable frame 14 is substantially the same for assembly 100 as previously described with respect to the prior-art assembly of FIGS. 1 and 2 excepting to the following relative the protective housing enclosing gear members 2 and 4.

In FIG. 3, gear members 2 and 4 are protectively enclosed by housing members 80 and 90 that are secured against movement relative frame 14 and are releasably joined together in a hinged relationship in combination with a releasable engagement means rather than solely by releasable engagement means previously described with respect to FIGS. 1 and 2.

The hinged relationship between members 60 and 90 is preferably a detachable hinge member provided by the combinations of spaced-apart extensions or tabs 39 which are adapted to extend from member 80 into corresponding openings 38 through lip 34 of housing member 90 with both tabs 39 and openings 38 dimensionally adapted to enable member 80 to swing away from member 90 for a distance desired and thence, if desired, enable members 80 and 90 to be completely separated from each other by removing tabs 39 from openings 38.

Alternatively, a more conventional hinged relationship may be employed between members 80 and 90 such as by pins and the like well known to those skilled in the art.

The additional spaced-apart releasable engagement means of assembly 100 is preferably provided by at least one and preferably by a pair of spaced-apart protuberances such as pins 28 which extend from surface 26 of member 90 and which are adapted to extend through corresponding openings 30 in surface 32 of member 80 and which preferably include slots 31 and are dimensionally adapted to provide a resilient releasable engagement means that is spaced-apart from the hinge member provided by tabs 30 and openings 38 a distance sufficient upon release of the releasable engagement means member 80 to pivot about the hinge member away from member 90 a distance sufficient to enable the degree of access to gear member 2 and 4 desired without having to completely separate housing members 80 and 90 from each other.

What is claimed is:

1. A gear assembly operable to rotate an adjusting screw to adjust position of a vehicular headlight, said assembly comprising intermeshed first and second gear members having their respective rotational axis angularly displaced from each other with said second gear member drivingly engaged with said adjusting screw and operable to rotate said adjusting screw in response to rotation of said first gear member, drive means operable to rotate said first gear member, and first and second housing members releasably joined together and adapted to protectively enclose said first and second gear members and provide rotational support therefor while providing access for the driving engagement between the adjustment screw and said second gear member and for the drive means for rotating said first gear member, said first and second housing members releasably joined together by hinge means spaced-apart from a releasable engagement means therebetween for a distance sufficient to enable said first and second housing members to pivot away from each other about said hinge means for a distance desired upon release of said releasable engagement means.

2. The assembly of claim 1 wherein the releasable engagement means comprises at least one protuberance extending from at least one of said first and second housing members into an opening in the other of said first and second housing members and adapted to provide said releasable engagement means therebetween.

3. The assembly of claim 2 wherein the releasable engagement means is a resilient releasable engagement means provided by at least one of said protuberance and said opening having sufficient resilience to provide said resilient releasable engagement between said first and second housing members.

4. The assembly of claim 1 wherein said hinge means is a detachable hinge means adapted to enable said first and second housing members to be completely separated from each other after release of said releasable engagement means.

5. The assembly of claim 1 wherein the drive means for rotating said first gear member comprises an elongate drive member having a rotational axis substantially aligned with the rotational axis of said first gear member and having an end thereof extending through said housing access and secured to said first gear member at the rotational axis thereof in a manner sufficient to enable rotation of said first gear member by said drive member.

6. The assembly of claim 1 wherein the drivingly engaged relationship between said second gear member and said adjusting screw is provided by said adjusting screw having a rotational axis substantially aligned with said second gear member rotational axis and having an end thereof extending through said housing access and secured to said second gear member at the rotational axis thereof in a manner sufficient to enable rotation of said adjustment screw by said second gear member.

7. The aeeembly of claim 5 wherein said drive member is a rod having an opposite end adapted to enhance rotation thereof.

8. The assembly of claim 5 wherein said drive member end is secured to said first gear member by extending into and being secured to a surrounding wall of an opening in said first gear member disposed coaxially about the rotational axis thereof.

9. The assembly of claim 6 wherein the adjusting screw is secured to said second gear member by extending into and being secured to a surrounding wall of an opening in said second gear member disposed coaxially about the rotational axis thereof.

10. The assembly of claim 1 wherein said first and second housing members have spaced-apart facing surfaces adapted to engage each other on opposite sides of said first and second gear members upon engagement between said first and said housing members.

11. The assembly of claim 10 wherein one of said first and second housing member surfaces is surrounded by a lip adapted to protectively enclose the other of said first and second surfaces upon engagement therebetween.

12. The assembly of claim 1 wherein said first and second housing members are made from a plastic material.

* * * * *